United States Patent Office 3,305,541
Patented Feb. 21, 1967

3,305,541
WATER-INSOLUBLE MONOAZO-PYRAZOLONE
DYESTUFFS
Hans Wilhelm Liechti, Oberwil, Basel-Land, Switzerland,
assignor to Ciba Limited, Basel, Switzerland, a Swiss
company
No Drawing. Filed Oct. 7, 1963, Ser. No. 314,548
Claims priority, application Switzerland, Oct. 10, 1962,
11,876/62; Sept. 20, 1963, 11,641/63
9 Claims. (Cl. 260—162)

The present invention provides new monoazo dyestuffs free from acid groups imparting solubility in water, corresponding to the formula

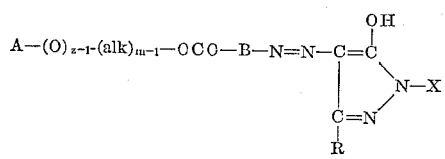

in which A represents an aryl group, B an arylene group, X an unsubstituted or substituted alkyl or aryl radical, R a lower alkyl group, "alk" a lower alkylene radical, $m=1$, 2 or 3, and $z$ is 1 or 2, wherein $m$ must have the same value as 2.

The dyestuffs of this invention correspond primarily to the formula

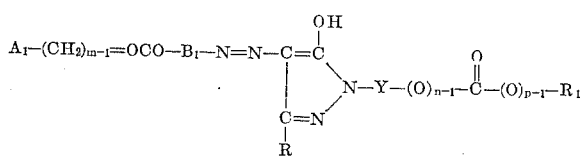

in which $A_1$ represents a phenyl group, $B_1$ a phenylene radical, R a lower alkyl group, $R_1$ a lower unsubstituted or substituted alkyl or aryl group, Y a lower alkylene or arylene group, and $m$, $n$ and $p$ each is 1, 2 or 3.

Especially valuable dyestuffs according to this invention are those of the formula

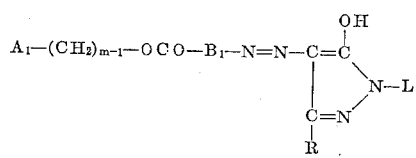

in which $A_1$, $B_1$, R and $m$ have the above meanings and L represents a phenyl radical which may be substituted by a lower alkyl or alkoxy group, by a carboxylic acid alkyl ester radical or by halogen atoms. Preferred dyestuffs covered by this definition are those of the formula

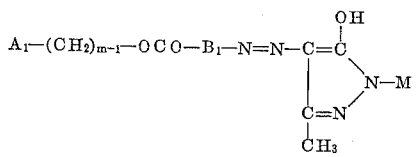

in which $A_1$, $B_1$ and $m$ have the above meanings and M represents phenyl, 2'-chlorophenyl or 2':5'-dichlorophenyl.

The present invention also provides a process for the manufacture of the new compounds wherein a diazotised amino compound of the formula

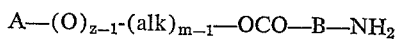

in which A represents an aryl group, B an arylene group, "alk" a lower alkylene radical and $m=1$, 2 or 3 and $z=1$ or 2, wherein $m$ must have at least the same value as $z$—is coupled with a compound of the formula

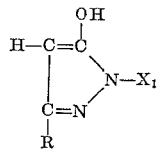

in which R represents a lower alkyl group, $X_1$ an unsubstituted or substituted alkyl or aryl radical—and, when $X_1$ contains a free hydroxyl group, the latter is subsequently esterified with a conventional acylating agent.

As diazo component there is preferably used a phenyl or benzyl ester of an aminobenzenecarboxylic acid.

The following diazo components may be mentioned in the first place:

3-aminobenzoic acid benzyl ester
4-aminobenzoic acid benzyl ester
4-aminobenzoic acid-para-methylbenzyl ester
3-aminobenzoic acid-4'-methoxybenzyl ester
4-aminobenzoic acid-4'-methoxybenzyl ester
4-aminobenzoic acid-4'-chlorobenzyl ester
4-aminobenzoic acid-3'-chlorobenzyl ester
4-aminobenzoic acid-3':4'-dichlorobenzyl ester
4-aminobenzoic acid-α-phenylethyl ester
4-aminobenzoic acid-β-phenylethyl ester
4-aminobenzoic acid-β-phenoxyethyl ester
4-aminobenzoic acid phenyl ester
4-aminobenzoic acid-4'-chlorophenyl ester and
4-aminobenzoic acid-2'- or -4'-methylphenyl ester.

Coupling components particularly suitable for use in the present process are those of the formula

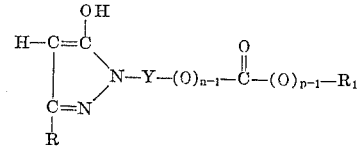

in which R represents a lower alkyl group, $R_1$ a lower unsubstituted or substituted alkyl or aryl radical, Y a lower alkylene or arylene group, and $n$ and $p$ each is 1 or 2.

A preferred coupling component is a 1-phenyl-3-methyl-pyrazolone-5 whose phenyl radical may be substituted by a lower alkyl or alkoxy group or by a carboxylic acid alkyl ester radical or by halogen atoms, and among these compounds those are especially valuable which correspond to the formula

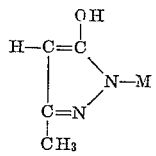

in which M represents a phenyl, 2'-chlorophenyl or 2':5'-di-chlorophenyl radical.

Suitable coupling components are also those of the formula

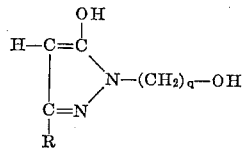

in which R represents a lower alkyl radical and $q=1$, 2, 3, or 4, and when such a compound is used the coupling reaction is followed by esterification of the aliphatically bound hydroxyl group, for example with the acid of an organic acid anhydride or halide.

As coupling components there may be mentioned above all:

1-(β-hydroxyethyl)-3-methyl-pyrazolone-5
1-(γ-hydroxypropyl)-3-methyl-pyrazolone-5
1-(β-carbomethoxyethyl)-3-methyl-pyrazolone-5
1-(β-ethanoyloxyethyl)-3-methyl-pyrazolone-5
1-(β-benzoyloxyethyl)-3-methyl-pyrazolone-5
1-(β-propanoyloxyethyl)-3-methyl-pyrazolone-5
1-(β-butanoyloxyethyl)-3-methyl-pyrazolone-5
1-(β-chloroethanoyloxyethyl)-3-methyl-pyrazolone-5,
  preferably 1-phenyl-3-methyl-pyrazolone-5
1-(2'-methylphenyl)-3-methyl-pyrazolone-5
1-(3'-methylphenyl)-3-methyl-pyrazolone-5
1-(4'-methylphenyl)-3-methyl-pyrazolone-5
1-(2'-methoxyphenyl)-3-methyl-pyrazolone-5
1-(4'-methoxyphenyl)-3-methyl-pyrazolone-5
1-(2'-chlorophenyl)-3-methyl-pyrazolone-5
1-(3'-chlorophenyl)-3-methyl-pyrazolone-5
1-(4'-chlorophenyl)-3-methyl-pyrazolone-5
1-(2':4'-dichlorophenyl)-3-methyl-pyrazolone-5
1-(2':5'-dichlorophenyl)-3-methyl-pyrazolone-5 and
1-(4'-ethoxycarbonylphenyl)-3-methyl-pyrazolone-5.

The diazo components are advantageously diazotised in the usual manner, for example with the aid of sodium nitrite and hydrochloric acid.

According to this invention the new dyestuffs are manufactured by coupling, advantageously under the conventionally used conditions, in a neutral to weakly alkaline aqueous medium, if desired with the use of a coupling promoter such, for example, as pyridine or picoline.

According to one variant of the manufacture of the new dyestuffs, instead of the aminobenzoic acid ester, the corresponding free aminobenzoic acid is diazotised and coupled with the selected pyrazolone, whereupon the azo-dyestuff-carboxylic acid so formed is esterified with the appropriate alcoholic or phenolic component respectively. Esterification may be performed, for example, by converting the azo-dyestuff-carboxylic acid into the acid halide, for example with thionylchloride in the usual manner, followed by reaction with the alcohol or phenol respectively.

The new azo dyestuffs—especially after having been suitably pasted—can be used with great advantage for dyeing and printing hydrophobic fibrous materials of, for example, cellulose esters and ethers, polyamides and polyurethanes, polyvinyl chloride and more especially fibers of polyesters, for example polyethylene terephthalates.

On the above-mentioned types of fibers there are obtained by the usual dyeing methods—for example from a dyebath containing a dispersion of the dyestuff and advantageously a dispersing agent, at temperatures in the neighbourhood of 100° C., if desired in the presence of a swelling agent, or at a temperature above 100° C. under superatmospheric pressure—pure, strong yellow dyeings which are distinguished by their particularly good fastness to light and sublimation; these fastness properties are not affected when the new dyestuffs are employed in green combinations, that is to say, in conjunction with blue dyestuffs.

It is a special advantage of the dyestuffs obtained by the present process that they produce dyeings of equally excellent fastness properties on polyester fibers both by the high-temperature process and by the carrier process.

It is another advantage of the dyestuffs that they are capable of substantially reserving any wool present when polyester fibers are being dyed. The following examples illustrate the invention. The parts and percentages are by weight unless otherwise indicated:

*Example 1*

A hydrochloric acid solution of 22.7 parts of 4-aminobenzoic acid benzyl ester is diazotised with a solution of 6.9 parts of sodium nitrite in 25 parts of water at 0 to 5° C. The resulting diazonium salt solution is slowly run at 5 to 8° C. into a solution of 18.4 parts of 1-(β-ethanoyloxyethyl)-3-methyl-pyrazolone-5 in 300 parts of water and 26.5 parts of sodium carbonate. The coupling furnishing the monoazo dyestuff takes place immediately. The precipitated dyestuff is isolated, washed with water and dried.

The new water-insoluble dyestuff of the formula

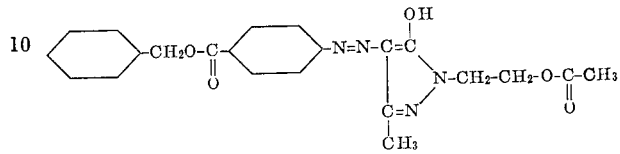

forms a yellow powder of which a fine dispersion dyes acetate rayon, triacetate rayon and polyamide fibers yellow shades having excellent properties of fastness.

The new dyestuff is especially suitable for dyeing polyester fibers yellow shades of excellent fastness to light and sublimation both by the high-temperature and the carrier processes.

Dyestuffs having equally good properties are obtained by using as coupling component 1-(β-propanoyloxyethyl)-3-methyl-pyrazolone-5, 1-(β-butanoyloxyethyl)-3-methyl-pyrazolone-5 or 1-(β-benzoyloxymethyl)-3-methylpyrazolone-5 instead of 1-(β-ethanoyloxyethyl)-3-methyl pyrazolone-5.

*Example 2*

A hydrochloric acid solution of 22.7 parts of 4-aminobenzoic acid benzyl ester is diazotised, and the diazonium salt solution is slowly run at 5 to 8° C. into a solution of 14.2 parts of 1-(β-hydroxy-ethyl)-3-methyl-pyrazolone-5 in 300 parts of water and 25 parts of 40% sodium hydroxide solution. The coupling furnishing the monoazo dyestuff takes place immediately. The precipitated dyestuff is isolated, washed with water until the washings run neutral, and dried.

The dyestuff is then pasted in 300 parts of acetic anhydride and refluxed for 1½ hours at 135 to 137° C., during which the dyestuff dissolves completely. The batch is then allowed to cool to 90° C., 3 parts of active carbon are added, and the whole is filtered. The filtrate is diluted at 10 to 15° C. with 200 parts of methanol, and the acetylated dyestuff is precipitated by cautiously adding 500 parts of ice water; it is then isolated, thoroughly washed with water and dried. The resulting dyestuff corresponds exactly to the dyestuff described in Example 1.

*Example 3*

22.7 parts of 4-aminobenzoic acid benzyl ester are diazotised, and the diazonium salt solution is slowly run at 5 to 10° C. into a solution of 17.4 parts of 1-phenyl-3-methyl-pyrazolone-5 in 300 parts of water and 25 parts of 40% sodium hydroxide solution. Coupling takes place immediately, and the monoazo dystuff precipitates completely; it is filtered off, washed with water until the washings run neutral, and dried.

The new water-insoluble dyestuff of the formula

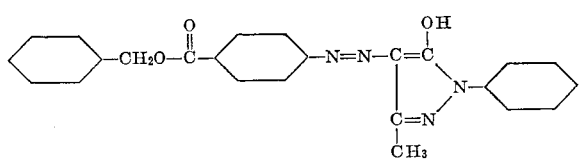

forms a yellow powder of which a fine dispersion dyes acetate rayon and polyamide fibers yellow shades having very good properties of fastness.

The new dyestuff lends itself particularly well to dyeing polyester fibers handsome yellow shades having excellent fastness to light and sublimation by the high-temperature, carrier and acetic acid and alkaline thermofixation methods.

When the 4-aminobenzoic acid benzyl ester is replaced by one of the derivatives listed below in the column headed "diazo component" and the 1-phenyl-3-methyl-pyrazolone-5 by a starting material shown in column "coupling component" of the following table, there are obtained further dyestuffs that dye polyester fibers yellow shades having very good fastness to light and sublimation:

In an analogous manner a number of dyestuffs described in Example 3 can be prepared by diazotising the free acid instead of the aminobenzoic acid esters shown in the table in Example 3, performing the coupling reaction, and esterifying the resulting azo-dyestuff-carboxylic acid in the manner described above with the corresponding alcohol or phenol listed above as the ester component.

| No. | Diazo component | Coupling component |
|---|---|---|
| 1 | 4-aminobenzoic acid benzyl ester | 1-(2'-methylphenyl)-3-methyl-pyrazolone-5. |
| 2 | ....do.... | 1-(3'-methylphenyl)-3-methyl-pyrazolone-5. |
| 3 | ....do.... | 1-(4'-methylphenyl)-3-methyl-pyrazolone-5. |
| 4 | ....do.... | 1-(2'-methoxyphenyl)-3-methyl-pyrazolone-5. |
| 5 | ....do.... | 1-(4'-methoxyphenyl)-3-methyl-pyrazolone-5. |
| 6 | ....do.... | 1-(2'-chlorophenyl)-3-methyl-pyrazolone-5. |
| 7 | ....do.... | 1-(3'-chlorophenyl)-3-methyl-pyrazolone-5. |
| 8 | ....do.... | 1-(4'-chlorophenyl)-3-methyl-pyrazolone-5. |
| 9 | ....do.... | 1-(2':4'-dichlorophenyl)-3-methyl-pyrazolone-5. |
| 10 | ....do.... | 1-(2':5'-dichlorophenyl)-3-methyl-pyrazolone-5. |
| 11 | ....do.... | 1-(4'-ethoxycarbonylphenyl)-3-methyl-pyrazolone-5 |
| 12 | 3-aminobenzoic acid benzyl ester | 1-phenyl-3-methyl-pyrazolone-5. |
| 13 | ....do.... | 1-(2'-chlorophenyl)-3-methyl-pyrazolone-5. |
| 14 | ....do.... | 1-(2':5'-dichlorophenyl)-3-methyl-pyrazolone-5. |
| 15 | 4-aminobenzoic acid phenyl ester | 1-phenyl-3-methyl-pyrazolone-5. |
| 16 | ....do.... | 1-(3'-chlorophenyl)-3-methyl-pyrazolone-5. |
| 17 | 3-aminobenzoic acid phenyl ester | 1-phenyl-3-methylpyrazolone-5. |
| 18 | 4-aminobenzoic acid-β-phenylethyl ester | Do. |
| 19 | ....do.... | 1-(2'-chlorophenyl)-3-methyl-pyrazolone-5. |
| 20 | ....do.... | 1-(3'-chlorophenyl)-3-methyl-pyrazolone-5. |
| 21 | ....do.... | 1-(2':5'-dichlorophenyl)-3-methyl-pyrazolone-5. |
| 22 | 4-aminobenzoic acid β-phenoxyethyl ester | 1-(β-acetoxyethyl)-3-methyl-pyrazolone-5. |
| 23 | ....do.... | 1-(β-benzoyloxyethyl)-3-methyl-pyrazolone-5. |
| 24 | ....do.... | 1-phenyl-3-methyl-pyrazolone-5. |
| 25 | ....do.... | 1-(2'-chlorophenyl)-3-methyl-pyrazolone-5. |
| 26 | 4-aminobenzoic acid-para-methylbenzyl ester | 1-phenyl-3-methyl-pyrazolone-5. |
| 27 | 3-aminobenzoic acid-4-methoxybenzyl ester | Do. |
| 28 | 4-aminobenzoic acid-para-methoxybenzyl ester | Do. |
| 29 | 4-aminobenzoic acid-para-chlorobenzyl ester | Do. |
| 30 | 4-aminobenzoic acid-3'-chlorobenzyl ester | Do. |
| 31 | 4-aminobenzoic acid-parachlorophenyl ester | Do. |
| 32 | 4-aminobenzoic acid-para-methylphenyl ester | Do. |
| 33 | 4-aminobenzoic acid-3':4'-dichlorobenzyl ester | Do. |

*Example 4*

32.2 parts of the dyestuff prepared from diazotised 4-aminobenzoic acid and 1-phenyl-3-methyl-pyrazolone-5 are stirred in 400 parts of dry chlorobenzene with 15 parts of thionylchloride and heated at 120 to 130° C. until hydrochloric acid gas is no longer being evolved, during which the dyestuff dissolves gradually. After cooling, petroleum ether is added until the reaction product has settled out completely, and it is then filtered off, washed on the filter with petroleum ether and dried under vacuum at 40 to 50° C.

The dyestuff acid chloride of the formula

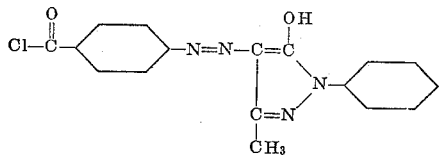

forms an orange-colored crystalline powder which melts at 168 to 170° C. after having been recrystallised from a mixture of chlorobenzene and petroleum ether.

34.05 parts of the acid chloride obtained in this manner are introduced at 80 to 90° C. into 150 parts of benzyl alcohol. The batch is then heated for 3 hours at 120 to 130° C., during which the chloride dissolves accompanied by a considerable evolution of hydrochloric acid gas. The batch is then allowed to cool, vigorously stirred into 1000 parts of water, and the resulting dyestuff ester of the formula

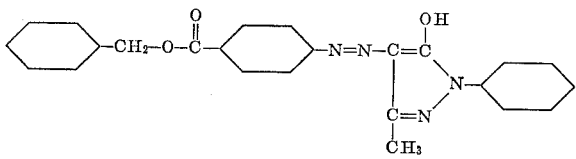

is filtered off. After thorough washing with water and drying, a dyestuff is obtained which is identical with the dyestuff prepared in Example 3.

*Example 5*

1 part of the dyestuff of Example 3 is ground wet with 2 parts of a 50% aqueous solution of sulphite cellulose waste liquor and then dried.

The above dyestuff preparation is stirred with 40 parts of a 10% aqueous solution of a condensation product obtained from octadecyl alcohol and 20 mols of ethylene oxide, and 4 parts of 40% acetic acid solution are added, and this paste is diluted with water to form a dyebath of 4000 parts.

100 parts of a cleaned polyester fiber material are immersed in this bath at 50° C., the bath is heated within half an hour to 120 to 130° C., and the material is dyed for one hour at this temperature in a closed vessel. The resulting strong, brilliant yellow dyeing has very good fastness to light and sublimation.

*Example 6*

A dyebath is prepared containing in 400 parts of water 12 parts of diammonium phosphate and 40 parts of a 10% aqueous solution of a condensation product prepared from octadecyl alcohol and 20 mols of ethylene oxide, 100 parts of a cleaned polyester fiber material are immersed in it at 50° C. and treated for 15 minutes. A solution of 12 parts of ortho-phenylphenol in dilute sodium hydroxide solution is added, and the fabric is treated for another 15 minutes at 50 to 55° C.

A fine dispersion of 1 part of the dyestuff described in Example 1 in 2 parts of a 50% aqueous solution of sulphite cellulose waste liquor is then added and the temperature is raised to the boil within half an hour. The material is then dyed for 1½ to 2 hours at the boil.

The dyed fiber is then treated for 30 minutes at 60 to 70° C. in a bath containing 2 parts of 30% sodium hydroxide solution and 10 parts of a 10% aqueous solution of a condensation product from octadecyl alcohol with 20 mols of ethylene oxide in 100 parts of water, and then rinsed. The resulting strong, brilliant yellow dyeing has very good fastness to light and sublimation.

What is claimed is:

1. A monoazo dyestuff of the formula

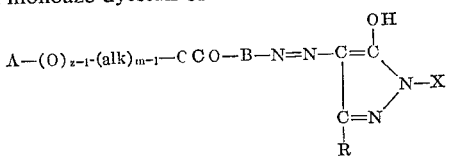

wherein A is a phenyl radical, B is phenylene R is lower alkyl, alk is lower alkylene, X is a member selected from the group consisting of hydroxy lower alkyl and phenyl which may be substituted by a member selected from the group consisting of lower alkyl, lower alkoxy, carbo lower alkoxy, bromine and chlorine and $m$ is a number from 1 to 3, $z$ is a number from 1 to 2 and wherein $m$ must have at least the same value as $z$.

2. A monoazo dyestuff corresponding to the formula

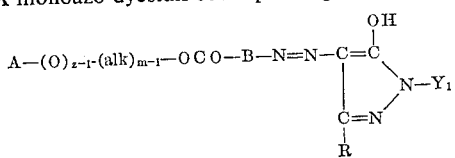

wherein A is a phenyl radical, B is phenylene, R is lower alkyl, alk is lower alkylene, $Y_1$ is hydroxy lower alkyl, $m$ is a number from 1 to 3, $z$ is a number from 1 to 2 and wherein $m$ must have at least the same value as $z$.

3. A monoazo dyestuff corresponding to the formula

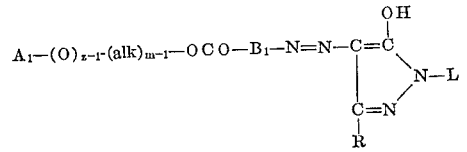

wherein A is a phenyl radical, $B_1$ is phenylene, R is lower alkyl, alk is lower alkylene, L is phenyl which may be substituted by a member selected from the group consisting of lower alkyl, lower alkoxy, carbo lower alkoxy, bromine and chlorine, $m$ is a number from 1 to 3, $z$ is a number from 1 to 2 and wherein $m$ must have at least the same value as $z$.

4. The dyestuff of the formula

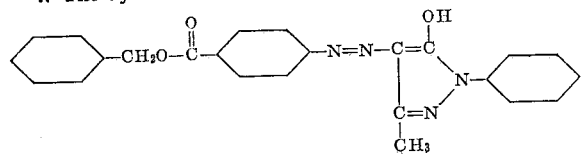

5. The dyestuff of the formula

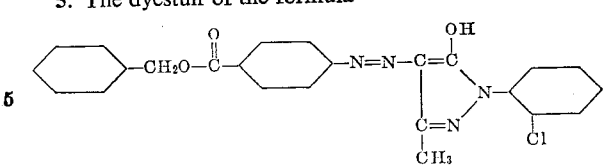

6. The dyestuff of the formula

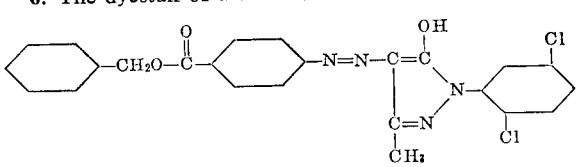

7. The dyestuff of the formula

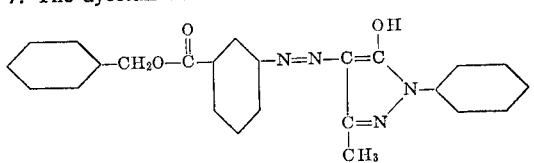

8. The dyestuff of the formula

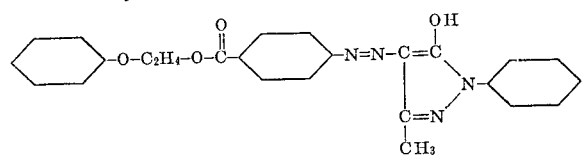

9. The dyestuff of the formula

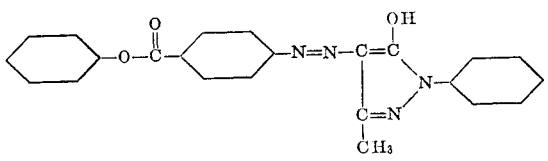

References Cited by the Examiner

UNITED STATES PATENTS 2,570,052 10/1951 Felix et al. _____ 260—162
2,776,959 1/1957 Frisch _____ 260—162

CHARLES B. PARKER, *Primary Examiner.*

F. D. HIGEL, *Assistant Examiner.*